United States Patent [19]

Young

[11] 4,074,536

[45] Feb. 21, 1978

[54] OIL WELL CONSOLIDATION TREATING

[75] Inventor: Bill M. Young, Duncan, Okla.

[73] Assignee: Halliburton Company, Duncan, Okla.

[21] Appl. No.: 710,751

[22] Filed: Aug. 2, 1976

[51] Int. Cl.$^2$ .............................................. E02D 3/14
[52] U.S. Cl. .................................. 61/36 C; 166/295; 260/448.2 N
[58] Field of Search ............... 61/36 C, 1 R; 166/295, 166/294; 106/287 SS; 260/DIG. 14, 448.2 N; 427/136; 71/64 SC

[56] References Cited

U.S. PATENT DOCUMENTS

| | | | |
|---|---|---|---|
| 3,208,525 | 9/1965 | Caldwell et al. | 166/295 |
| 3,282,338 | 11/1966 | Walther et al. | 166/295 |
| 3,316,966 | 5/1967 | Dear et al. | 166/295 |
| 3,476,189 | 11/1969 | Bezemer et al. | 166/295 |
| 3,625,287 | 12/1971 | Young | 166/295 |
| 3,646,999 | 3/1972 | Hamby, Jr. et al. | 166/295 |

*Primary Examiner*—Paul R. Gilliam
*Assistant Examiner*—Alex Grosz
*Attorney, Agent, or Firm*—Robert S. Nisbett; John H. Tregoning; Thomas R. Weaver

[57] ABSTRACT

A treating process is provided for increasing the stability and resistance to degradation of naturally or artificially consolidated, permeable masses such as earthen formations or subterranean formations having exposed siliceous surfaces which are contacted by aqueous media. The treatment is effected by contacting the porous mass with a particular type of organosilicon compound which has a hydrophobic functional group and a silica bonding functional group to form a hydrophobic film on the exposed surfaces.

7 Claims, No Drawings

OIL WELL CONSOLIDATION TREATING

The invention of this application relates to a method and particular compounds for increasing the stability of the consolidating structure of earthen and other porous permeable masses to deterioration or degradation, particularly when exposed to aqueous fluids such as water, steam, acidic or alkaline solutions or naturally occurring aqueous solutions. This increase in resistance to degradation is effected by establishing a hydrophobic film on the consolidated masses at the points which are typically subject to attach by aqueous media.

Difficulties with naturally or artificially consolidated earthen masses or subterranean formations occur when these formations are exposed to certain media and began to deteriorate. These masses can be naturally consolidated surface or subterranean masses or artificially consolidated surface or subterranean masses. Numerous artificial or manmade consolidated masses and procedures are available using various types of resins and placement procedures. Typical consolidating formulations and procedures are described in the following patents and references: U.S. Pat. Nos. 3,176,767, 3,443,637, 3,199,590, 3,646,999, 3,208,522, 3,702,783, 3,209,826, 2,706,592, 3,285,339, 3,734,763, 3,305,017.

Plueddemann, E. P., "Water is Key to New Theory on Resin-to-Fiber Bonding," MODERN PLASTICS, (March, 1970). Harrisberger, W. H.; Coulter, A. W.; and Gurley, D. G. "Application of Recent Advances in the Mechanics of Sand Consolidation," SPE Preprint No. 3589, presented at the 46th Annual Fall Meeting of the SPE of AIME, New Orleans, La., Oct. 3-6, 1971.

The above cited patents and references and information cited therein are incorporated herein by reference to the extent necessary.

A major cause of the breakdown of the consolidating structure of both natural and artificially consolidated permeable masses is the contact of aqueous media with exposed silica surfaces and/or the dislocation of consolidating siliceous matter which binds the permeable masses together. Some exposed silica surfaces result in even the most carefully placed artificial consolidation formulations and procedures for numerous reasons. For example, under certain subterranean conditions the consolidation may merely deteriorate with time; the consolidation may deteriorate due to thermal expansion and contraction and resulting cracks in the consolidating structure; or by merely chemical attack or reaction of portions of the consolidating structure with fluids in the permeable mass.

It has now been discovered that a treating procedure and certain organosilicon compounds can be used to stop or significantly decrease the degradation of naturally and artificially consolidated permeable masses which have exposed silica surfaces or siliceous material which are subject to attack by aqueous media. This treating procedure involves the contacting of the siliceous surfaces with certain types of organosilicon compounds which have a hydrophobic group and a silica bonding group. This treating procedure in effect forms a hydrophobic film on the siliceous surfaces or at the points or attack on the permeable mass which excludes the aqueous media normally causing the deterioration. By this invention there is provided a process for increasing the stability and resistance to degradation by aqueous media of a consolidated permeable mass wherein the permeable mass contains exposed siliceous surfaces comprising contacting said permeable mass with a treating fluid containing at least one organosilicon compound having a hydrophobic group and a silica bonding group and maintaining said treating fluid in contact with said permeable mass under conditions which cause said organosilicon compounds to bond to said siliceous surfaces and to form a hydrophobic film on said siliceous surfaces.

The treating procedure and compositions of this invention can be used with any naturally occurring consolidation or artifical or man-made consolidation employing numerous resins. For example, the treating process of this invention can be used with the consolidating resins and procedures described in the references cited above. It is especially useful for preferred resins such as the phenol formaldehyde type resin, the epoxy resins, the furan resin systems, the inorganic silica based consolidation systems, and the vinyl type polymer consolidation systems. Since the only essential reactive group in the organosilicon compounds of this invention is the silica bonding group, the compositions and processes of this invention do not normally react with or bond with the natural or artificial consolidating resin. Therefore, the consolidating system of this invention is practically universally applicable to any permeable mass having siliceous surfaces. If desired, optional resin bonding functional groups can be incorporated in the materials used in the processes of this invention.

In the treating process of this invention, at least one organosilicon compound of this invention is placed in contact and maintained in contact with the permeable mass under conditions which will allow the organosilicon compound to bond to the exposed silica surfaces, leaving the hydrophobic group exposed and forming a hydrophobic film on the siliceous surfaces. This contact can be established and maintained by any one of several conventional procedures.

For example for permeable masses having exposed surfaces, the organosilicon compound could be placed on the porous mass by merely spraying or pouring the organosilicon compound onto the mass or diluting it with a carrier fluid and then spraying the fluid onto the permeable mass. For subterranean formations such as those encountered in oil wells, earthen dams and other subterranean structures, the organosilicon composition is preferably placed in a carrier fluid and injected or pumped through the permeable mass and maintained under quiescent conditions for a sufficient length of time to insure that the organosilicon has bonded to the silica surfaces forming the hydrophobic film. Normally, the contact time required is very short or may be considered to be instantaneous; however, the reactive condition such as concentration of any unnecessary reactants, concentration of the organosilicon compounds, temperature and any other factors which would affect the necessary reactions must be considered.

For certain preferred organosilicon compounds the silica bonding group is a coupled or encapsulated state which requires the presence of minute amounts of water to hydrolyze the silica bonding group and thus allow the organosilicon compound to bond to the silica surfaces. For most subterranean formations, the amount of water necessary is normally available within the formation. For some applications it may be necessary or desirable to add small amounts of water to the carrier fluid to speed up the hydrolysis of the organosilicon compound to the desired rate. The treating step of this invention may be added to conventional consolidating procedures so that the organosilicon compound is available upon initial consolidation of the consolidating resin or the treating step of this invention can be applied as a single or repeated remedial step for those wells in which water and sand production is an imminent problem. For use with conventional consolidating procedures the hydrophobic silane should not be applied until the consolidating resin has at least attained an initial set.

Conventional consolidating steps such as preflush, cleaning and postflush steps can be used in conjunction with the treating step of this invention to insure uniform placement and treating of the desired formations. It has been found that a minimum concentration of organosilicon compound can be used because only the exposed siliceous surfaces are treated. Any excess organosilicon compound can be removed from the formation by allowing the fluid to flow back into the well and away from the formation or the excess organosilicon can be flushed further into the formation being treated, in which case it will bond to the exposed silica surface.

Typically, the organosilicon compounds may be present in the carrier in concentrations of about 0.1 to 15% by volume. Lower concentrations merely affect the practical rate of treatment and extent of complete treatment. Higher concentrations merely result in an excess organosilicon compound which must be removed or flushed into the formation. With the application of certain organosilicon combinations to certain resins an overtreating effect is observed. This effect can be readily detected prior to any proposed treatment by simple laboratory tests. With some hydrophobic silicons the treatment results in by-products such as ammonia which are produced upon hydrolysis of the organosilicon compound. It is known that some by-products have detrimental reactions with certain resin combinations, particularly with higher concentrations. The effect of this overexposure to hydrophobic silicon can be reduced by the use of lower organosilicon concentrations and reduction in the contacting time.

The carrier fluid used to place the organosilicon compounds of this invention can be an aqueous media such as a water solution or an emulsion. However, an organic carrier fluid such as a commercially available solvent or hydrocarbon oils such as diesel oil is preferred. Under some conditions, it may be desirable to apply the organosilicon compound without a separate carrier fluid, in which case the neat organosilicon compound will be its own carrier fluid. The organosilicon compound can be contacted with the permeable mass under ambient conditions and at temperatures in the range of about 50° to 300° F.

Normally pH, typically encountered contaminants, and other formation conditions are not critical but contaminants should be avoided which will react with the organosilicon bonding group or any other optional reactive group which may be desired, thereby interfering with the silica bonding reaction. Preferably, the hydrophobic group is a simple or substituted hydrocarbon group which is relatively unreactive under the conditions of most earthen or subterranean formations.

The organosilicon compounds which can be used in the process of this invention are those which have a hydrophobic group and a silica bonding group. Silicon normally has a valence of 4 and the formulae shown herein are intended to have the number of radicals necessary to satisfy that valence. Preferred classes of organosilicon compounds for this invention include organohalogen silanes, organosilane esters, silyl acetamides, cyclosiloxanes, cyclosilazanes and silazanes. Preferred organosilicon compounds are described by the formula listed under the following four classes with specific examples of each class following the formula description:

$$(R_1)_n—Si—(R_2)_{4-n} \qquad (I)$$

wherein each $R_1$ is independently a hydrocarbon composed of alkyl, cycloalkyl, alkenyl, cycloalkenyl and aryl radicals or combinations thereof containing up to about 18 carbon atoms; each $R_2$ is independently a halogen radical, $—OR_3$ or $—OH$; each $R_3$ is independently a hydrocarbon composed of alkyl radicals, aryl radicals or combinations thereof containing up to about 10 carbon atoms; and $n$ is an integer equal to 1-3. Specific examples are trihexylchlorosilane, triphenylchlorosilane, trimethylchlorosilane, dimethyldichlorosilane, phenyltrichlorosilane, methylvinyl dichlorosilane, octadecyltrichlorosilane, triethylbromosilane, triethylfluorosilane, vinyl triethoxysilane, amyltriethoxysilane, dimethyldiethoxysilane, phenyltriethoxysilane, methyltriethoxysilane, diphenyldimethoxysilane, methylphenyldimethoxysilane, trimethylethoxysilane, 7-octenyltrimethoxysilane, octadecyltriethoxysilane, bis-(cycloheptenyl)methyldichlorosilane, bis-(cycloheptenyl)triethoxysilane, benzyltriethoxysilane, diphenylsilanediol, etc.

$$(R_4)_m—\underset{(R_5)_q}{Si}—(R_6)_p \qquad (II)$$

wherein each $R_4$ is independently equal to $R_1$; each $R_5$ is independently a halogen radical; each $R_6$ is indenpendently $—N_3$, $—NH-Si-(R_4)_3$, or $—N(CH_3)—Si—(R_4)_3$; $m$ is an integer equal to 2-3; $q$ is an integer equal to 0-1; $p$ is an integer equal to 1-2; and $m + q + p = 4$.

Specific examples are hexamethyldisilazane, azidotrimethylsilane, methylphenyldiazidosilane, hexaphenyldisilazane, heptamethyldisilazane, dimethyldiazidodisilane, triphenylsilazide, diphenyldiazidosilane, etc.

$$R_7—\underset{O-Si—(R_8)_3}{C=N—Si—(R_8)_3} \qquad (III)$$

wherein $R_7$ is independently equal to $R_1$ or $R_5$; and each $R_8$ is independently equal to $R_3$ or a hydrogen radical with at least one $R_8$ equal to $R_3$.

Specific examples are bis-(trimethylsilyl)acetamide, bis-(dimethylsilyl)acetamide, N-Methyl-N-trimethylsilylacetamide, etc.

wherein $R_9$ is $—O—$ or $—NH—$ and $x$ is an integer equal to 3-4.

Specific examples are octamethylcyclotetrasiloxane and octamethylcyclotetrasilazane, hexamethylcyclotrisilazane, hexamethylcyclotrisiloxane, 2,2 dimethyltetraphenylcyclotrisiloxane, hexaphenylcyclotrisiloxane, octaphenylcyclotetrasiloxane, etc.

From the above formulae and examples other suitable organosilicon compounds will be readily available to those skilled in the art.

The following examples serve to illustrate various embodiments of the invention and enable one skilled in the art to practice the invention. Parts, percentages, proportions and concentrations are by weight unless indicated otherwise.

EXAMPLES

Consolidations Prepared for Water Resistance Tests

Fifty grams of Oklahoma No. 1 sand were packed into a vertically mounted thin walled section of glass tubing (⅝ inch inside diameter and 7 inches long) to a height of 3.5 inches. In the bottom section of the glass tubing was positioned a perforated rubber stopper. To retain the test sand while permitting effluent fluids to pass through the test sand, a wire screen with a thin layer of glass wool on top of it was placed over the perforation (inside of the glass tubing). All treating fluids were injected through the test sand at 72° F using 10 psig. Each furan resin consolidation was prepared by injecting the following treating fluids through the test sands.

| Treating Sequence | Treating Fluid | Volume, cc |
| --- | --- | --- |
| 1 | Standard Brine | 100 |
| 2 | Diesel Oil preflush | 130 |
| 3 | Furan Resin | 70 |
| 4 | Diesel Oil Spacer | 70 |
| 5 | Diesel Oil-phthalyl chloride catalyst | 350 |

The resultant resin-treated sands were allowed to cure at 200° F for 7 days at atmospheric pressure. During this cure period diesel oil-catalyst solution was contained in the pore spaces. Three separate consolidations were made for treatment with each hydropholic silicon to be tested. Each consolidation was divided equally into two separate test core sections (top and bottom). In this manner a total of six test cores were available for each silicon chemical treatment. Three consolidations (six cores) were made for standards which were not subjected to silicon chemical treatments. Clean Oklahoma No. 1 sand was used because better duplication in strengths can be obtained from one test to another.

Hydrophobic Silicone Treating Procedure Of Furan Resin Consolidated Sands

Each test consolidation was flushed with the following fluids (72° F) at 10 psig.

| Treating Sequence | Treating Fluid | Volume, cc |
| --- | --- | --- |
| 1 | Diesel Oil (to stabilize flow) | 300 |
| 2 | Standard Brine | 100 |
| 3 | Diesel Oil Containing Silicone Chemicals* | 20 |

*The percentage of hydrophobic silicon chemical dissolved in the diesel oil range from 1% to 10% by volume dependent on the particular test involved. These are arbitrary volumes of carrier fluid and hydrophobic silicons selected for use in the initial study. However, low volumes and concentrations of hydrophobic silicons may be workable for specific applications. Optimum volumes and concentrations can be readily determined in view of this disclosure.

The "standard" consolidations were subjected to the same treatment as described above except the silicon chemical was left out of the No. 3 treating fluid.

Each treated consolidation was placed in a 200° F environment for 24 hours. Although the hydrophobic silicon chemical should react upon contact with the exposed silica surface, 24 hours were allowed for these exploratory tests.

Six standard cores (72° F) were tested for compressive strength properties. These consolidations were not to be subjected to boiling water tests.

The treatment of the consolidations with a brine solution prior to injecting the diesel oil containing the hydrophobic silicon chemical was done in these preliminary tests to insure that enough water would be present, if necessary, to react with the silicon for facilitating chemical bonding to the exposed sand surfaces. This, however, may not be necessary since sufficient water will probably be present on the sand to promote the necessary reaction.

The treated and "standard" consolidations were placed in a 200° F environment for 24 hours with the pore spaces filled with the diesel oil or hydrophobic silicon diesel oil solution. At the end of this period the cores were transferred to a 212° F boiling fresh water environment. The consolidations remained in boiling water continuously for 7 days (168 hours). Compressive strengths (at 72° F) of these hydrophobic silicon treated consolidations were compared to the "standard" consolidation strengths after both had been subjected to the boil test. The compressive strengths (at 72° F) of the standard consolidations (not subjected to boil tests) were also compared to "standard" consolidations (subjected to boil tests).

Consolidations Prepared for Surface (Wettability) Properties

The following test sand mixture was used to determine if the hydrophobic silicon compound would change substantially the wettability properties of the furan resin consolidation.

| Materials | Parts by Wt. |
| --- | --- |
| Oklahoma #1 Sand | 88 |
| Silica fines | 10 |
| Bentonite | 2 |

This sand was selected since it represents many formation sands as to size distribution and clay content. Also, it was felt that with the increased surface area of the fine particles present more detectable damage, due to any change in surface properties would likely occur.

Two test consolidations were prepared with the sand contained inside tetrafluoroethylene tubing (1 inch inside diameter) by 4 inches in length). Into each tetrafluoroethylene enclosure were packed first 5 grams of Oklahoma No. 1 sand (¼ inch in height) followed by 3½ inches of clayey test sand, and 5 grams (¼ inch in height) layer of Oklahoma No. 1 sand on top of the clayey sand. Appropriate size screens were positioned at the lower end of each vertically mounted tetrafluoroethylene tube to permit retention of the sands while permitting production of effluent fluids therethrough. The tetrafluoroethylene sleeves were housed with a heating jacket (metal enclosure). Into each test sand (maintained at 105° F) were injected, using 20 psig, the following 105° F treating fluids.

| Treating Sequence | Treating Fluid | Treating Vol., cc |
|---|---|---|
| 1 | Standard Brine* | 20 |
| 2 | Standard Brine** | 800 |
| 3 | Diesel Oil** | 800 |
| 4 | Diesel Oil Preflush | 150 |
| 5 | Furan Resin | 100 |
| 6 | Diesel Oil Spacer | 100 |
| 7 | Diesel Oil-Phthalyl Chloride Catalyst | 400 |

*Allowed the clays to hydrate overnight after this treating step.
**Flow to stabilized flow conditions.

The consolidations were allowed to cure for 24 hours at 140° F. The consolidations then were treated as described below:

| Treating Fluid Sequence | Treating Fluid | Consolidation #1 | Consolidation #2 |
|---|---|---|---|
| 1 | Standard Brine | 100 | 100 |
| 2 | Diesel Oil | 50 | None |
|   | Diesel Oil containing 0.5 cc Trimethylchlorosilane |   | 50 |

All treating fluids were injected at 140° F using 20 psig. Both consolidations were permitted to remain in a 140° F environment for 18 hours, i.e., with the pore spaces filled with the step 2 treating fluid. Consolidation No. 1 (Standard) was run to determine permeability damage which can be expected to result by the treatment with brine and diesel oil.

The diesel oil permeabilities of the respective consolidations (no. 1 and 2) were obtained by injecting 400 cc of diesel oil (140° F) through each consolidation to stabilize flow conditions. Squeeze pressure was 20 psig.

Table 1
Water Resistance Data Concerning the Treatment of Furan Resin Consolidations With Hydrophobic Silicon Compounds*

| Hydrophobic Silicon Chemical | % By Vol. Diesel Oil Overflush Solution | % Retention of Compressive Strength of Furan Resin Consolidation After Exposure to 7 Days (168 hrs) 212° F Fresh Water |
|---|---|---|
| None |   | 75.19 |
| Trimethylchlorosilane | 1 | 106.1 |
| Trihexylchlorosilane | 1 | 106.7 |
| Triphenylchlorosilane | 1 | 99.8 |
| Hexamethyldisilazane | 1 | 97.7 |
| Hexamethyldisilazane | 10 | 52.2 |
| Octylmethylcyclotetrasiloxane | 10 | 98.0 |
| Dimethyldiethoxysilane | 10 | 98.5 |
| Dimethyldiethoxysilane | 1 | 90.0 |
| Dimethyldichlorosilane | 1 | 90.7 |
| N-9-bis-(trimethylsilyl)-adenine | Not oil soluble |   |
| Amyltriethoxysilane | 10 | 91.96 |
| Trimethylmethoxysilane | 10 | 90.0 |
| 1,3-bis-(3-glycidoxypropyl)-Tetramethyldisiloxane | 10 | 85.7 |
| Bis-(trimethylsilyl)-acetamide | 10 | 91.5 |
| Azidotrimethylsilane | 10 | 94.4 |

*Original compressive strengths of standards (not boiled) averaged 2002 psi. Each strength figure reported in this table was obtained from the average strength obtained on 6 cores (3 consolidations).

Table 2
Diesel Oil Flow Tests on Consolidation 1 (Untreated) And 2 (Treated With Hydrophobic Silicone Chemical)

| | Test Core 1* | Test Core 2* |
|---|---|---|
| Permeability of Consolidation before brine and diesel oil treatment | 446 md | |
| Permeability of Consolidation after brine and diesel oil treatment | 405.4 md | |
| Permeability damage, % loss, due to brine and diesel oil treatment | 9.1% | |
| Permeability of Consolidation before brine and diesel oil-hydrophobic silicone treatment | | 661.2 md |
| Permeability of Consolidation after brine and diesel oil-hydrophobic silicone treatment | | 587.8 md |
| Permeability damage, % loss, due to brine and diesel oil-hydrophobic silicone treatment | | 11% |
| Loss or gain attributable to hydrophobic silicone treatment | | 11% − 9% = −2%** |

*Test core No. 1 was a standard core which was not to be subjected to hydrophobic silicone treatment whereas Test Core No. 2 was to be silicone treated.
**This figure is within experimental error. Some possible allowances should be considered for the differences in the original consolidated test sand permeabilities prior to treatment and permeability tests. Both loose sands were packed to the same diesel oil permeability prior to furan resin consolidations, however, after consolidation the test cores were characterized by different permeabilities.

I claim:

1. A process for increasing the stability and resistance to degradation by aqueous media of a consolidated permeable mass where the permeable mass contains exposed siliceous surfaces comprising, contacting said permeable mass with a treating fluid containing at least one organosilicon compound having a hydrophobic group and a silica bonding group, and maintaining said treating fluid in contact with said permeable mass under conditions which cause said organosilicon compound to form a hydrophobic film on said siliceous surfaces and increases resistance to degradation by water.

2. A process of claim 1 for increasing the stability and resistance to degradation by water and acid of a consolidated, permeable mass where the permeable mass contains exposed siliceous grain surfaces, wherein the consolidation has been effected by injecting a hardenable fluid into said mass, wherein said process comprises contacting said permeable mass with a treating fluid containing at least one organosilicon compound having a hydrophobic group and a silica bonding group, and maintaining said treating fluid in contact with said formation under conditions which cause said organosilicon compound to form a hydrophobic film on said siliceous surfaces.

3. A method of claim 2 of increasing the water resistance of a consolidated formation having exposed siliceous surfaces comprising: injecting into said formation a fluid carrier containing 0.1–15% by weight of at least one hydrophobic organosilicon compound having at least one hydrophobic organic group and at least one silica bonding group selected from organohalogen silanes, organosilane esters, silazanes, silylacetamides, cyclosiloxanes and cyclosilazanes, wherein the halogen is selected from fluorine, chlorine, bromine or iodine, the organic radicals are selected from alkyl, aryl and combinations thereof, wherein each alkyl or aryl radical contains up to 18 carbon atoms; and allowing the organosilicon compound to form a film on said siliceous surfaces in said formation.

4. A process of claim 2 for increasing the stability and resistance to degradation by water and acid of a consolidated permeable mass where the permeable mass contains exposed siliceous surfaces comprising: injecting said permeable mass with a treating fluid containing at least one organosilicon compound having a hydrophobic group and a silica bonding group wherein the organosilicon compound is selected from compounds represented by one of the following formulae:

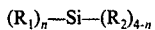   (I)

wherein each $R_1$ is independently a hydrocarbon composed of alkyl, cycloalkyl, alkenyl, cycloalkenyl and aryl radicals or combinations thereof containing up to about 18 carbon atoms; each $R_2$ is independently a halogen radical, $-OR_3$ or $-OH$; each $R_3$ is independently a hydrocarbon composed of alkyl radicals, aryl radicals or combinations thereof containing up to about 10 carbon atoms; and $n$ is an integer equal to 1-3

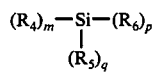   (II)

wherein each $R_4$ is independently equal to $R_1$; each $R_5$ is independently a halogen radical; each $R_6$ is independently, $-N_3$, $-NH-Si-(R_4)_3$, or $-N(CH_3)-Si-(R_4)_3$; $m$ is an integer equal to 2-3, $q$ is an integer equal to 0-1; $p$ is an integer equal to 1-2; and $m + q + p = 4$; or

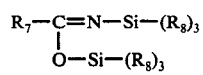   (III)

wherein $R_7$ is independently equal to $R_1$ or $R_5$; and each $R_8$ is independently equal to $R_3$ or a hydrogen radical with at least one $R_8$ equal to $R_3$; or

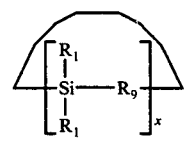   (IV)

wherein $R_9$ is $-O-$ or $-NH-$; and $x$ is an integer equal to 3-4; and maintaining said treating fluid in contact with said permeable mass under conditions which cause said organosilicon compound to form a hydrophobic film on said siliceous surfaces.

5. A process of claim 1 for improving a consolidation treatment by incorporating in said consolidation procedure a step for treating a consolidated porous earthen formation having exposed siliceous surfaces to increase the stability and resistance to degradation by water and acids comprising: injecting into said formation a treating fluid containing at least one organosilicon composition having a hydrophobic group and a silica bonding group, said organosilicon composition being present in said fluid in a concentration sufficient to treat the exposed silica surfaces of the consolidated formation; maintaining said treating fluid within said formation to be treated under conditions which cause said organosilicon composition to treat substantially all of the exposed silica surfaces; and flushing the fluid from said consolidated porous formation.

6. A method of claim 1 of increasing the water resistance of a consolidated formation having exposed siliceous surfaces comprising: contacting said formation with a fluid carrier containing 0.1-15% by weight of at least one hydrophobic organosilicon compound having at least one hydrophobic organic group and at least one silica bonding group selected from organohalogen silanes, organosilane esters, silazanes, silylacetamides, cyclosiloxanes and cyclosilazanes, wherein the halogen is selected from fluorine, chlorine, bromine or iodine, the organic radicals are selected from alkyl, aryl and combinations thereof, wherein each alkyl or aryl radical contains up to 18 carbon atoms; and allowing the organosilicon compound to form a film on said siliceous surfaces in said formation.

7. A process of claim 1 for increasing the stability and resistance to degradation by water and acid of a consolidated permeable mass where the permeable mass contains exposed siliceous surfaces comprising: contacting said permeable mass with a treating fluid containing at least one organosilicon compound having a hydrophobic group and a silica bonding group wherein the organosilicon compound is selected from compounds represented by one of the following formulae:

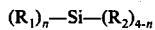   (I)

wherein each $R_1$ is independently a hydrocarbon composed of alkyl, cycloalkyl, alkenyl, cycloalkenyl and aryl radicals or combinations thereof containing up to about 18 carbon atoms; each $R_2$ is independently a halogen radical, $-OR_3$ or $-OH$; each $R_3$ is independently a hydrocarbon composed of alkyl radicals, aryl radicals or combinations thereof containing up to about 10 carbon atoms; and $n$ is an integer equal to 1-3

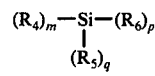   (II)

wherein each $R_4$ is independently equal to $R_1$; each $R_5$ is independently a halogen radical; each $R_6$ is independently $-N_3$, $-NH-Si-(R_4)_3$, or $-N(CH_3)-Si-(R_4)_3$; $m$ is an integer equal to 2-3; $q$ is an integer equal to 0-1; $p$ is an integer equal to 1-2; and $m + q + p = 4$; or

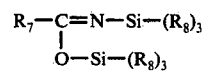   (III)

wherein $R_7$ is independently equal to $R_1$ or $R_5$; and each $R_8$ is independently equal to $R_3$ or a hydrogen radical with at least one $R_8$ equal to $R_3$; or

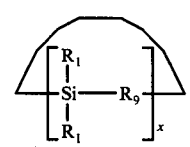   (IV)

wherein $R_9$ is $-O-$ or $-NH-$; and $x$ is an integer equal to 3-4; and maintaining said treating fluid in contact with said permeable mass under conditions which cause said organosilicon compound to form a hydrophobic film on said siliceous surfaces.

* * * * *